United States Patent
Schubert et al.

(10) Patent No.: US 10,281,122 B2
(45) Date of Patent: May 7, 2019

(54) LUMINAIRE JUNCTION BOX HOUSING

(71) Applicant: ABL IP Holding LLC, Decatur, GA (US)

(72) Inventors: Matthew Schubert, Roselle, IL (US); Joseph B Stauner, Algonquin, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 15/371,369

(22) Filed: Dec. 7, 2016

(65) Prior Publication Data

US 2017/0167699 A1 Jun. 15, 2017

Related U.S. Application Data

(60) Provisional application No. 62/264,979, filed on Dec. 9, 2015.

(51) Int. Cl.
| | |
|---|---|
| *E04G 25/00* | (2006.01) |
| *F21V 21/04* | (2006.01) |
| *F21S 8/02* | (2006.01) |
| *F21V 21/22* | (2006.01) |
| *F21V 21/34* | (2006.01) |
| *F21V 23/00* | (2015.01) |
| *H02G 3/10* | (2006.01) |
| *H02G 3/20* | (2006.01) |

(52) U.S. Cl.
CPC ............ *F21V 21/048* (2013.01); *F21S 8/026* (2013.01); *F21V 21/22* (2013.01); *F21V 21/34* (2013.01); *F21V 23/001* (2013.01); *H02G 3/10* (2013.01); *H02G 3/20* (2013.01)

(58) Field of Classification Search
CPC ................................ F21V 21/048; H02G 3/20
See application file for complete search history.

(56) References Cited

U.S. PATENT DOCUMENTS

| | | | |
|---|---|---|---|
| 3,597,889 A | 8/1971 | Nigro | |
| 6,889,943 B2 | 5/2005 | Dinh et al. | |
| 7,297,870 B1 * | 11/2007 | Sartini | H02G 3/125 174/50 |
| 8,201,962 B2 * | 6/2012 | Wedekind | H02G 3/20 248/343 |
| 8,297,579 B1 | 10/2012 | Gretz | |
| 9,239,131 B1 * | 1/2016 | Wronski | F21V 21/048 |
| 9,696,021 B2 * | 7/2017 | Wronski | F21V 21/22 |

FOREIGN PATENT DOCUMENTS

CA 2941051 5/2017

OTHER PUBLICATIONS

Office Action for Canadian Application No. CA 2,951,297, dated Nov. 7, 2017, 4 pages.
CA 2,951,297, "Office Action," dated Oct. 30, 2018, 3 pages.

\* cited by examiner

*Primary Examiner* — Amy J. Sterling
(74) *Attorney, Agent, or Firm* — Kilpatrick Townsend & Stockton LLP

(57) ABSTRACT

A junction box housing system includes a housing, a first hanger connected to a first side of a sidewall of the housing, and a second hanger connected to a second side of the sidewall distal from the first side. In various examples, the housing is movable along the first hanger and the second hanger in a horizontal direction.

14 Claims, 6 Drawing Sheets

LUMINAIRE JUNCTION BOX HOUSING

REFERENCE TO RELATED APPLICATION

This application claims the benefit of U.S. Provisional Application No. 62/264,979, filed Dec. 9, 2015 and entitled LUMINAIRE SHALLOW JUNCTION BOX HOUSING, the content of which is hereby incorporated by reference in its entirety.

FIELD OF THE INVENTION

Embodiments of the invention relate to a junction box housing, and more specifically a retrofit luminaire junction box housing for light emitting diode (LED) recessed fixtures.

BACKGROUND

Electrical fixtures, such as luminaires, must be adequately supported when installed because a fixture that is improperly supported may break away from the location where it is installed, such as in a ceiling. Ceilings are typically constructed of structural members including a series of spaced apart joists, which are covered by covering material such as drywall. However, the ceiling covering material is typically not designed to support loads such as those imparted by electrical fixtures. Therefore, in order to suspend electrical fixtures from the ceiling, the weight must be supported by the joists. In recessed lighting applications, the luminaire is supported between adjacent joists, but the number and size of components needed for the luminaire may limit when recessed lighting may be used.

SUMMARY

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In various embodiments, a junction box housing system includes a housing, a first hanger connected to a first side of a sidewall of the housing, and a second hanger connected to a second side of the sidewall. In various examples, the housing is movable along the first hanger and the second hanger in a horizontal direction.

In various embodiments, a method of installing the junction box housing system includes: placing the housing between a first joist and a second joist; securing the first hanger to the first joist and the second joist securing the second hanger to the first joist and the second joist; and horizontally positioning the housing along the first hanger and the second hanger between the first joist and the second joist.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Examples of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Embodiments of the present invention are directed to a junction box housing system and methods of employing the junction box housing for wall or ceiling installation. The junction box housing system may be used with light emitting diode (LED) luminaires, although it will be appreciated that various other types of luminaires (regardless of the light source) may be used. In some embodiments, the junction box housing system may be used for retrofit luminaires, although they need not be. The junction box housing system incorporates the junction box and housing as one unit such that the luminaire may be wired directly in, and allow for easy mounting of a luminaire within the housing in insulated covered applications. In some embodiments, the junction box housing system allows the housing to be adjusted vertically, horizontally, or both horizontally and vertically when the housing is installed between standard joists. In some embodiments, the vertical adjustment may accommodate different ceiling thicknesses in which the junction box housing is installed.

Figure 1:
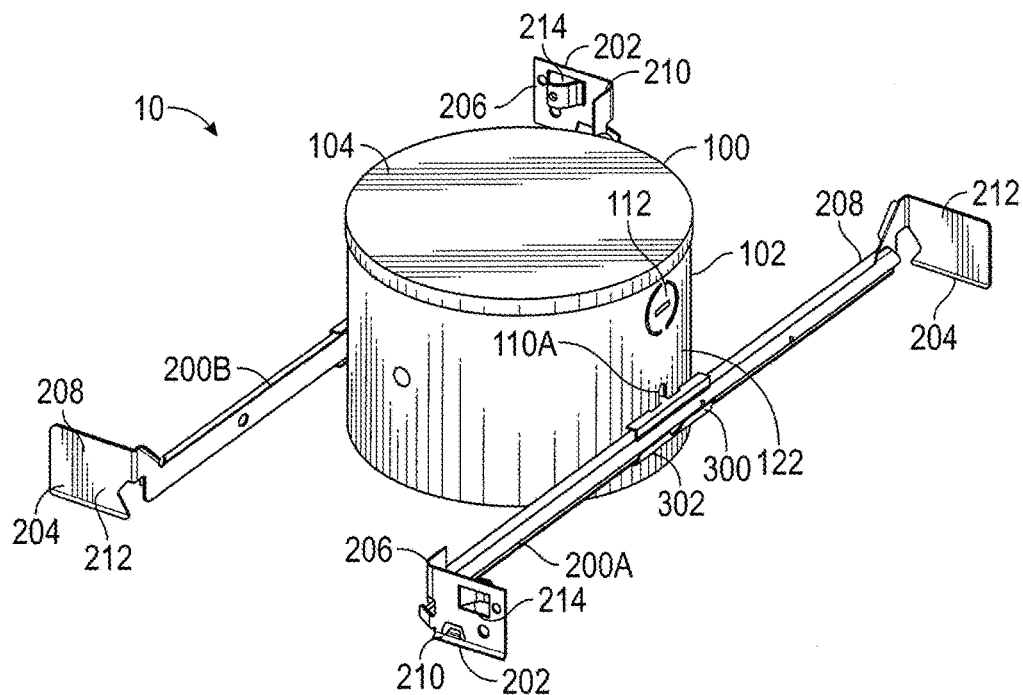
FIG. 1 is a perspective view of a junction box housing system according to various embodiments.
Figure 2:
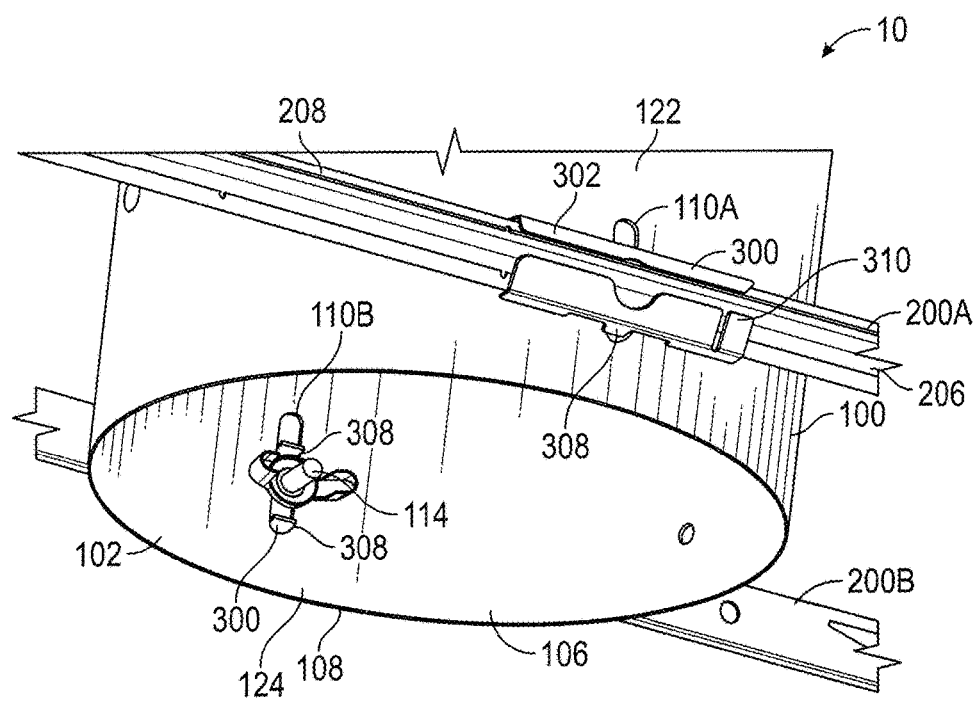
FIG. 2 is a detail perspective view of the junction box housing system of FIG. 1.

Referring to FIGS. 1-7 and 12, a junction box housing system 10 includes a housing 100, a first hanger 200A, and a second hanger 200B. The housing 100 includes a sidewall 102 and an endwall 104. As illustrated in FIG. 2, the housing 100 defines a housing chamber 106 having a housing chamber opening 108. In various examples, the housing chamber 106 is dimensioned to accommodate a luminaire, such as an LED retrofit luminaire 500 (see FIG. 12), within the housing chamber 106. It will understood, however, that while a LED luminaire 500 is discussed herein, the junction box housing system 10 disclosed is not limited for use with only LED luminaires. Rather, the junction box housing system 10 may be used with any type of luminaire, regardless of the light source within the luminaire.

In various examples, the housing 100 may have a substantially circular cross-sectional profile. However, in various other examples, the housing 100 may have various other desired cross-sectional profiles including, but not limited to, square, rectangular, elliptical, angled, octagonal, or various other suitable profiles. Referring to FIG. 1, in some embodiments, the sidewall 102 defines at least one wiring knockout 112. If wiring is needed within the housing chamber 106, the at least one wiring knockout 112 may be removed to define at least one wiring aperture 120 (see FIGS. 6-9), and the wiring may be inserted through the at least one wiring aperture 120. In various other examples, the wiring knockout 112 may be omitted, and the at least one wiring aperture 120 may be initially provided. In some cases, the housing 100 includes support brackets 126 and 128 (see FIGS. 9 and 11) or various other supporting components within the housing chamber 106 for supporting the luminaire 500 or various other component within the housing 100 (see FIG. 12).

Figure 3:
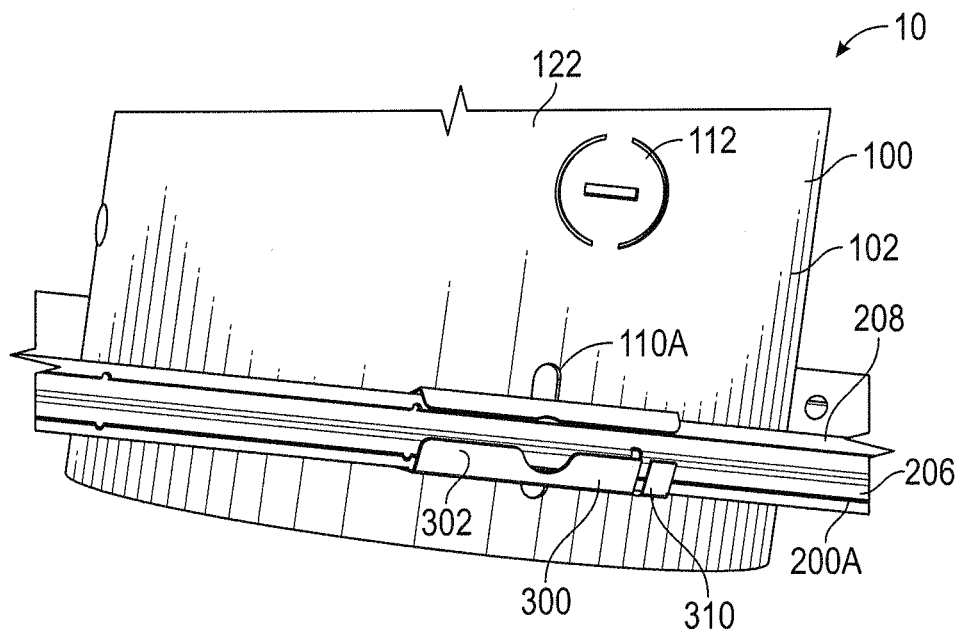
FIG. 3 is another detail perspective view of the junction box housing system of FIG. 1.

Referring to FIGS. 1-3, the first hanger 200A is connected to a first side 122 of the sidewall 102 and the second hanger 200B is connected to a second side 124 of the sidewall 102 distal from the first side 122, such as opposite the first side 122. As described in detail below, the housing 100 is movable along the first hanger 200A and the second hanger 200B in a horizontal direction. Although reference below will be made to the first hanger 200A, it will be appreciated that the following description is equally applicable to the second hanger 200B.

The first hanger 200A includes a first end 202 and a second end 204. As illustrated in FIG. 1, the first end 202 may include a first support tab 210 and the second end 204 may include a second support tab 212. In various embodiments, both the first support tab 210 and the second support tab 212 are configured to abut joists, as described in detail below. In some embodiments, one or both support tabs 210 and 212 may include fastener receivers 214 dimensioned to accommodate fasteners (such as fasteners 500 illustrated in FIGS. 6-11) that may secure the hangers 200A and 200B to the joists. In the present example, the second support tabs 212 of the first hanger 200A and the second hanger 200B do not include the fastener receivers 214; however, in other examples, the first support tabs 210 and the second support tabs 212 may both define fastener receivers 214 (see FIGS. 6-11). In some embodiments, the first hanger 200A and the second hanger 200B are oriented on the housing 100 such that the first end 202 of the first hanger 200A is distal from the first end 202 of the second hanger 200B (see FIG. 1), although they need not be.

In some embodiments, the first hanger 200A is a unitary component or a combination of components defining a fixed distance between the first end 202 and the second end 204. In other embodiments, the first hanger 200A is adjustable such that a distance from the first end 202 to the second end 204 may be varied. As one non-limiting example, as illustrated in FIGS. 1-3 and 6-11, the first hanger 200A may include a first portion 206 that includes the first end 202 and a second portion 208 that includes the second end 204. In some embodiments, the second portion 208 defines a channel that is configured to receive the first portion 206 such that the first portion 206 is movable within the channel to vary the distance between the first end 202 and the second end 204. In various other examples, various other mechanisms for adjusting the distance between the first end 202 and the second end 204 may be used.

Figure 4:
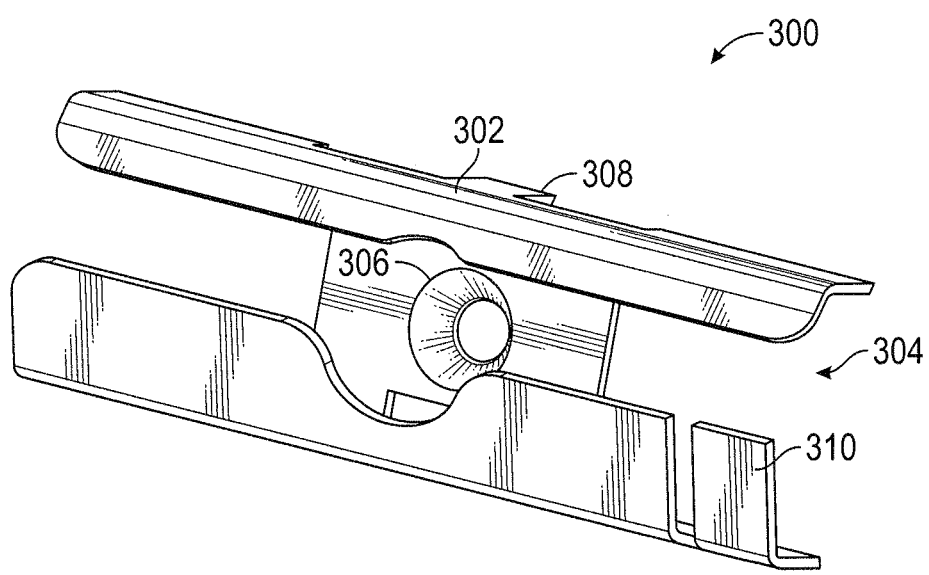
FIG. 4 is a front perspective view of a hanger bracket of the junction box housing system of FIG. 1.
Figure 5:
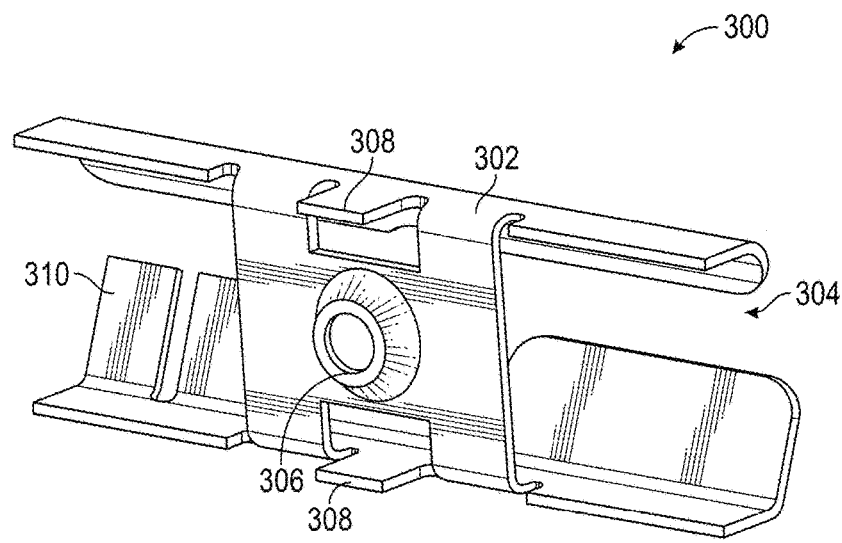
FIG. 5 is a rear perspective view of the hanger bracket of FIG. 4.
Figure 6:
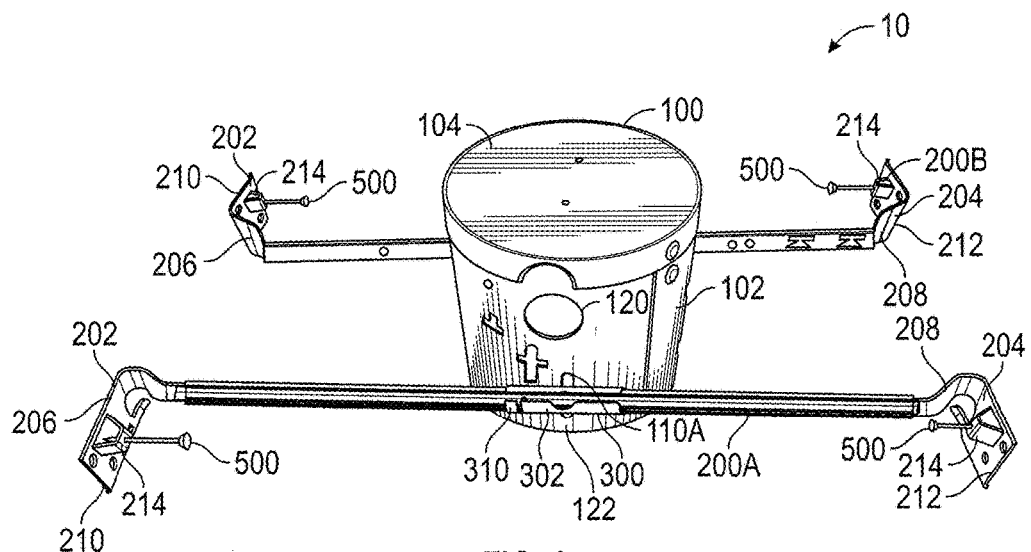
FIG. 6 is a top perspective view of the junction box housing system of FIG. 1.
Figure 7:
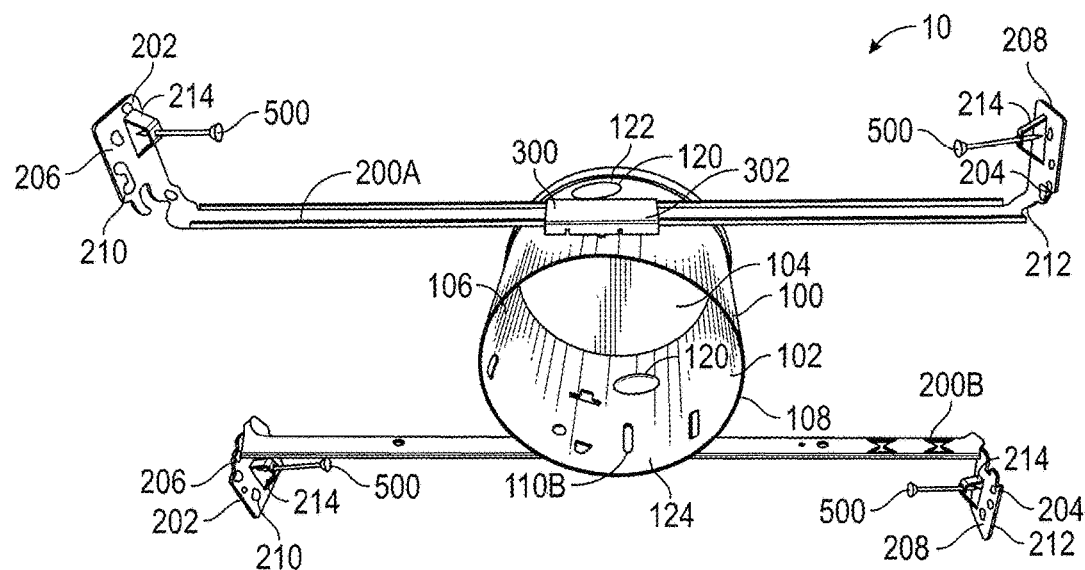
FIG. 7 is a bottom perspective view of the junction box housing system of FIG. 1.

Referring to FIGS. 1-3 and 6, in some embodiments, the first hanger 200A is connected to the housing 100 through a hanger bracket 300. Referring to FIGS. 4 and 5, in various embodiments, the hanger bracket 300 includes a body 302 that is configured to be positioned on the first hanger 200A. As one non-limiting example, in some embodiments, the body 302 defines a channel 304 that is dimensioned to accommodate the first hanger 200A such that the hanger bracket 300 may be positioned on the first hanger 200A. Various other configurations of the body 302 may be used such that the hanger bracket 300 may be positioned on the first hanger 200A. When the hanger bracket 300 is positioned on the first hanger 200A, it may be movable along the first hanger 200A between the first end 202 and the second end 204, although it need not be.

Again referring to FIGS. 4 and 5, in some examples, the body 302 of the hanger bracket 300 includes at least one locking tab 308. In the examples illustrated in FIGS. 4 and 5, the body 302 includes two locking tabs 308 (a top and a bottom locking tab), although in various other examples, any number of locking tabs 308 may be used. As described in detail below, the locking tabs 308 are dimensioned and configured to engage a first mounting slot 110A defined in the housing 100 such that the housing 100 is supported by the hanger bracket 300 on the first hanger 200A.

In various embodiments, the body 302 of the hanger bracket 300 includes a bracket stopper 310. In the present example, the bracket stopper 310 is a stopper tab that may be depressed or deformed to engage the first hanger 200A and secure the hanger bracket 300 at a desired horizontal position along the first hanger 200A. Because the housing 100 may be supported by the hanger bracket 300, securing the hanger bracket 300 at the desired horizontal position along the first hanger 200A also secures the housing 100 at the desired horizontal position along the first hanger 200A. In various examples, the body 302 may optionally define a stopper aperture 306 that is dimensioned to accommodate a housing stopper 114 that secures the housing 100 relative to the hanger 200A, although it need not.

Referring back to FIGS. 1-3, in the examples where the hanger bracket 300 is provided with the first hanger 200A and the second hanger 200B, the housing 100 may define a first mounting slot 110A and a second mounting slot 110B (see FIG. 2). As illustrated in FIG. 2, the first mounting slot 110A is defined in the first side 122 of the sidewall 102 and the second mounting slot 110B is defined in the second side 124 of the sidewall 102 that is distal from the first side 122 of the sidewall 102. In these embodiments, the first mounting slot 110A and second mounting slot 110B are defined on opposite sides of the sidewall 102, and their orientations may be aligned with each other in some examples. The mounting slots 110A and 110B are configured to receive the locking tabs 308 on the hanger brackets 300 on each of the first hanger 200A and the second hanger 200B such that the housing 100 is supported on the first hanger 200A and the second hanger 200B through the hanger brackets 300.

In some examples, as illustrated in FIGS. 1 and 2, the hanger bracket 300 is able to translate within the mounting slots 110A and 110B. In these examples, the hanger brackets 300 are slidable relative to the slots 110A and 110B such that the housing 100 may be vertically adjusted. In some embodiments, the housing 100 is at a lowermost vertical position relative to the hangers 200A and 200B when the hanger bracket 300 is engaged with top ends of the mounting slots 110A and 110B. In these embodiments, the housing 100 is at an uppermost vertical position relative to the hangers 200A and 200B when the hanger bracket 300 is engaged with bottom ends of the mounting slots 110A and 110B.

As illustrated in FIG. 2, in some embodiments, housing stoppers 114 may engage the housing 100 to secure the housing 100 and hanger brackets 300 at the desired position relative to the hangers 200A,B (the housing stopper 114 for the first hanger 200A is not illustrated in FIG. 2). The housing stoppers 114 may be various suitable fastening mechanisms including, but not limited to, nuts and bolts, screws, pins, clips, hooks, snaps, and various other fastening mechanisms. In the embodiment illustrated in FIG. 2, the housing stoppers 114 comprise bolts with wing nuts. In some embodiments, the housing stoppers 114 may be secured to the hanger brackets 300 through the stopper apertures 306, although they need not. For example, in other embodiments, the housing stoppers 114 may be self-piercing fasteners that may pierce through the hangers 200A,B and hanger brackets 300 without needing stopper apertures 306.

Referring to FIGS. 8-11, a junction box housing system 11 is illustrated. The junction box housing system 11 is similar to the junction box housing system 10 except that the first side 122 and the second side 124 of sidewall 102 of the housing 100 each define a first mounting aperture 116 and a second mounting aperture 118 in place of the mounting slots 110A, 110B. Although reference below will be made to the first side 122 of the sidewall 102, it will be appreciated that the following description is equally applicable to the second side 124 of the sidewall 102.

Figure 8:
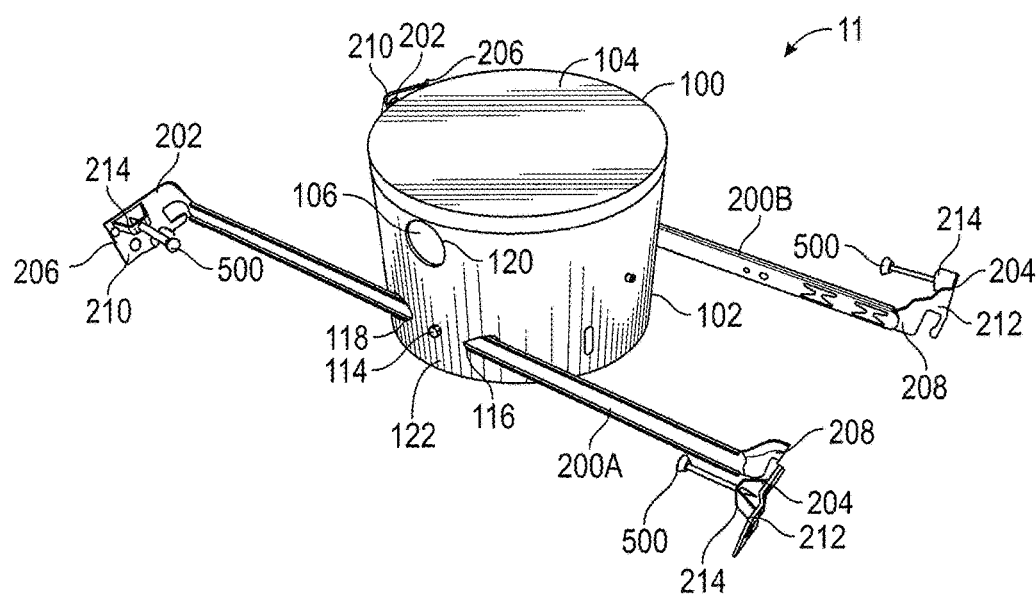
FIG. 8 is a top perspective view of a junction box housing system according to various embodiments.
Figure 9:
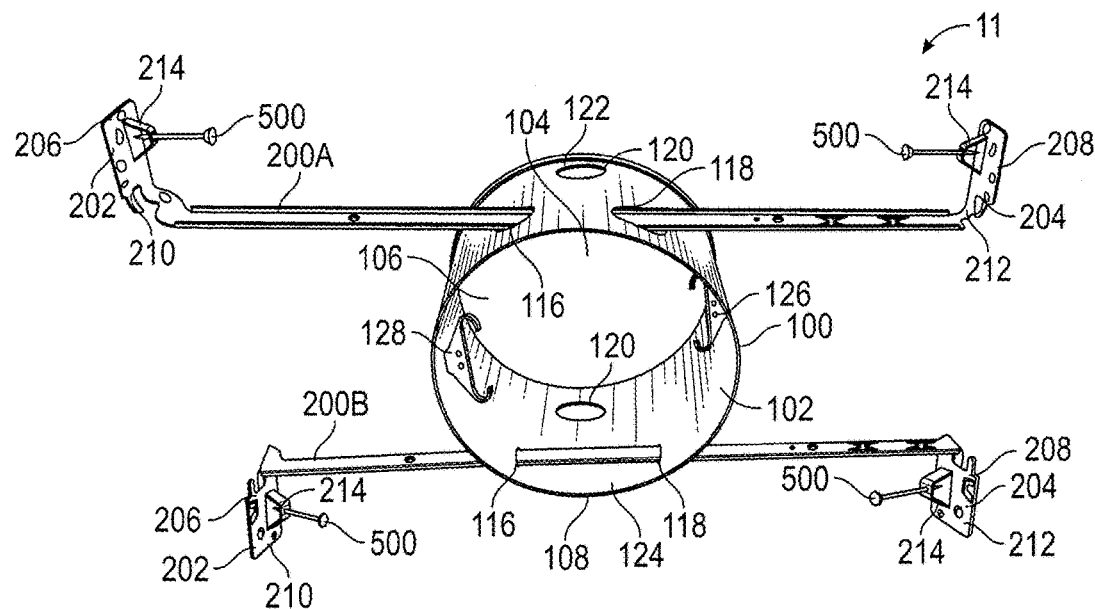
FIG. 9 is a bottom perspective view of the junction box housing system of FIG. 8.

As illustrated in FIGS. 8 and 9, the first side 122 of the sidewall 102 defines the first mounting aperture 116 and the second mounting aperture 118. The first mounting aperture 116 and the second mounting aperture 118 are aligned in the horizontal direction such that the first hanger 200A may be inserted through the first mounting aperture 116 and the second mounting aperture 118. In some of these embodiments, the first hanger 200A comprises at least two components that are detachable such that the first hanger 200A may be inserted through the mounting apertures 116 and 118. For example, the first hanger 200A may comprise the first portion 206 that includes the first end 202 and the second portion 208 that includes the second end 204. In this example, the first portion 206 may be inserted through one or both mounting apertures 116 and 118, and the second portion 208 may then be inserted through one or both the apertures 116 and 118 and engage the first portion 206. In various other embodiments, the first hanger 200A may be a unitary component that is dimensioned to be inserted through the mounting apertures 116 and 118.

In these examples, when the first hanger 200A is inserted through the aligned mounting apertures 116 and 118, a portion of the first hanger 200A extends within the housing chamber 106 (see FIG. 9). As compared to the junction box housing system 10, in the junction box housing system 11, the housing 100 is connected to the first hanger 200A by directly engaging the first hanger 200A at the first mounting aperture 116 and the second mounting aperture 118. In this manner, the housing 100 may be directly supported by the first hanger 200A (rather than through a hanger bracket 300). Similar to the housing 100 of the junction box housing system 10, the housing 100 illustrated in FIGS. 8-11 is movable along the first hanger 200A in the horizontal direction to various desired positions. When the housing 100 is at the desired position, a housing stopper 114 may engage the housing 100 and the first hanger 200A to horizontally secure the housing 100 relative to the first hanger 200A. In some examples, the housing stopper 114 may be inserted through an aperture defined by the housing 100 and may frictionally engage the first hanger 200A. In other examples, the housing stopper 114 is self-piercing and pierces through the housing 100 and engages the first hanger 200A. Depending on the type of housing stopper 114, the housing stopper 114 may engage the housing 100 and first hanger 200A through various other mechanisms.

Figure 10:
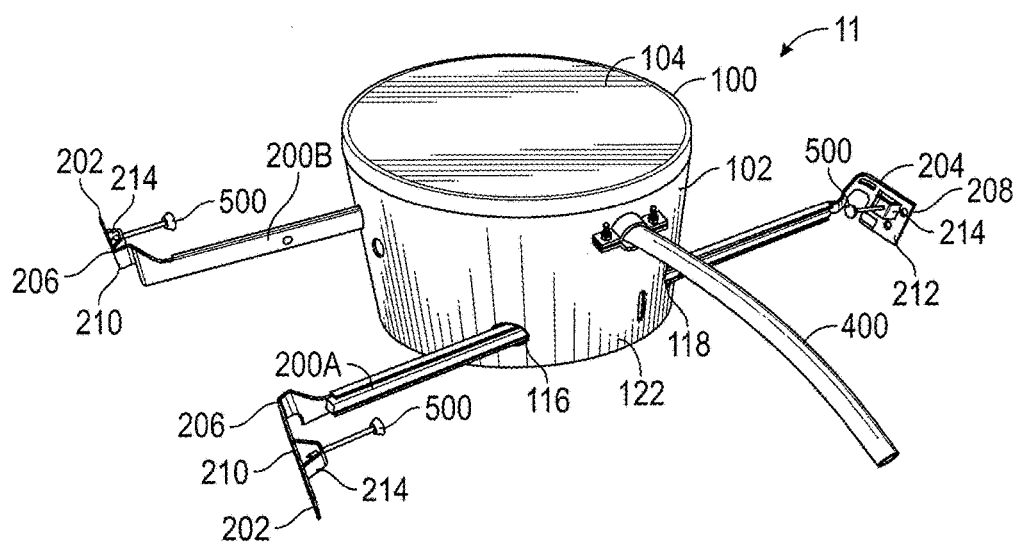
FIG. 10 is a top perspective view of the junction box housing system of FIG. 8 with wiring.
Figure 11:
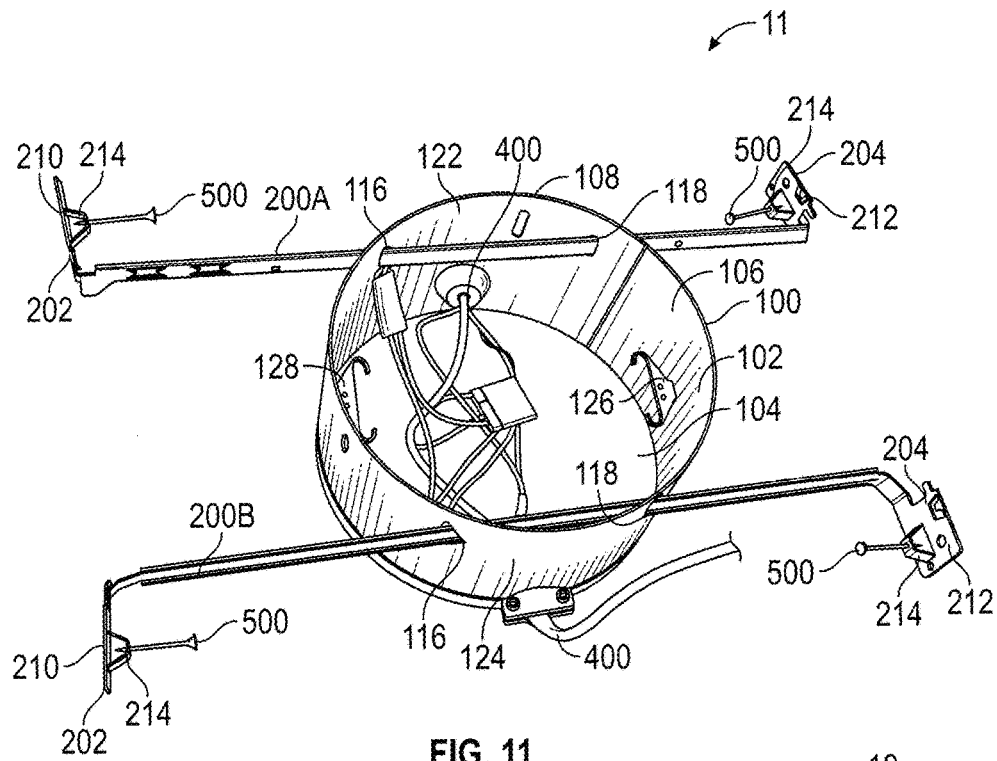
FIG. 11 is bottom perspective view of the junction box housing system of FIG. 8 with wiring.
Figure 12:
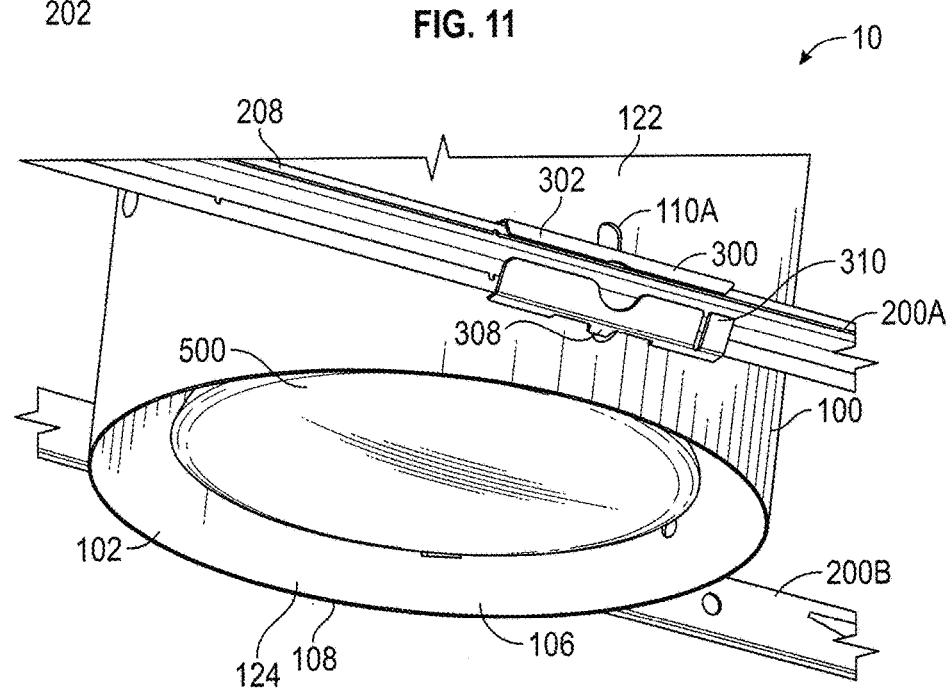
FIG. 12 is a perspective view of the junction box housing system of FIG. 1 with a luminaire.

FIGS. 10 and 11 illustrate wiring 400 supplied to the housing chamber 106 through the wiring aperture 120. Various other types of cabling or conduit connections may be used with the housing 100. In some embodiments, the wiring 400 may be pre-installed, while in other embodiments, the wiring 400 may be installed during installation of the junction box housing system 10 or 11.

Referring back to FIG. 1, a method of installing the junction box housing system 10 is also provided. It will be appreciated that although the method is described with reference to the junction box housing system 10, similar steps may be used to install the junction box housing system 11 except where noted.

In various examples, the housing 100 of the junction box housing system 10 is attached to the first hanger 200A and the second hanger 200B by inserting the locking tabs 308 of hanger brackets 300 on each of the first hanger 200A and the second hanger 200B into the mounting slots 110A and 110B. In some embodiments, fasteners may be pre-installed in fastener receivers 214 of the first hanger 200A and the second hanger 200B, although they need not be. In the junction box housing system 11, the housing 100 is attached to the first hanger 200A and the second hanger 200B by inserting the first hanger 200A and the second hanger 200B through first mounting apertures 116 and second mounting apertures 118 provided at the first side 122 and the second side 124 of the sidewall 102, respectively.

The housing 100 is placed between a first joist and a second joist. The first hanger 200A and the second hanger 200B are secured to both the first joist and the second joist. In some embodiments, the first hanger 200A and the second hanger 200B are both secured to the first joist before the first hanger 200A and second hanger 200B are secured to the second joist, although they need not be. In various examples, prior to securing the first hanger 200A and the second hanger 200B to the joists, a length of the first hanger 200A and the second hanger 200B may be adjusted to vary the distance between the first end 202 and the second end 204 of the hangers 200A,B.

The housing 100 may be horizontally positioned at a desired location between the first joist and the second joist by moving the housing 100 along the first hanger 200A and the second hanger 200B. In some embodiments, at the desired position along the first hanger 200A and the second hanger 200B, bracket stoppers 310 of the hanger brackets 300 on each of the first hanger 200A and the second hanger 200B are engaged with the first hanger 200A and the second hanger 200B, respectively, to horizontally secure the housing 100. In the junction box housing system 11, housing stoppers 114 at the first and second portions of the sidewall 102 may engage the housing 100 with the first hanger 200A and the second hanger 200B, respectively, to horizontally secure the housing 100. In the junction box housing system 10, the housing stoppers 114 may engage the housing 100 with the first hanger 200A and the hanger bracket 300 on the first hanger 200A, as well as engage the housing 100 with the second hanger 200B and the hanger bracket 300 on the second hanger 200B.

In some embodiments, the housing 100 is vertically adjusted such that the housing 100 is at a desired height relative to the joists. For example, in various embodiments, the housing 100 is vertically adjustable to accommodate different joists and ceilings that have different thicknesses. In various examples, vertically adjusting the housing 100 includes engaging the hanger brackets 300 on each of the first hanger 200A and the second hanger 200B with the first mounting slot 110A and the second mounting slot 110B, respectively, and vertically positioning the hanger brackets 300 within the mounting slots 110A and 110B. In various examples, wiring 400 is inserted through the wiring aperture 120 defined in the housing 100 before installation of the housing 100 or after installation of the housing 100. The luminaire 500 (see FIG. 12) may be installed and supported within the housing chamber 106 by mounting the luminaire 500 on the support brackets 126 and 128 (see FIGS. 9 and 11).

Different arrangements of the components depicted in the drawings or described above, as well as components and steps not shown or described are possible. Similarly, some features and sub-combinations are useful and may be employed without reference to other features and sub-combinations. Examples of the invention have been described for illustrative and not restrictive purposes, and alternative examples will become apparent to readers of this patent. Accordingly, the present invention is not limited to the examples described above or depicted in the drawings, and various examples and modifications may be made without departing from the scope of the claims below.

That which is claimed is:

1. A junction box housing system comprising:
   a junction box housing comprising a sidewall and an endwall, the sidewall and the endwall defining a junction box housing chamber having a housing chamber opening, wherein the endwall encloses an end of the junction box housing chamber that is opposite from the housing chamber opening;
   a first hanger connected to a first side of the sidewall;
   a second hanger connected to a second side of the sidewall distal from the first side; and
   a first hanger bracket and a second hanger bracket for connecting the junction box housing to the first and second hangers, wherein the first and second hanger brackets each connects the junction box housing to only one of the first and second hangers and wherein:
      the first hanger bracket defines a channel that accommodates the first hanger such that the first hanger bracket is positioned on the first hanger between a first end and a second end of the first hanger and is movable along the first hanger, wherein the junction box is connected to the first hanger via the first hanger bracket; and
      the second hanger bracket defines a channel that accommodates the second hanger such that the second hanger bracket is positioned on the second hanger between a first end and a second end of the second hanger and is movable along the second hanger, wherein the junction box is connected to the second hanger via the second hanger bracket;
   wherein the junction box housing is movable along the first hanger and the second hanger in a horizontal direction,
   wherein the first hanger bracket and the second hanger bracket are each located in a vertical position on the junction box housing, and wherein the vertical position of the first hanger bracket is adjustable independent of the second hanger bracket,
   wherein the first hanger bracket further defines a stopper aperture with an opening the channel of the first hanger bracket, and
   wherein the junction box housing system further comprises a first housing stopper that is positionable within the aperture and configured to engage the first hanger and the first side of the sidewall of the junction box housing to prevent relative translation between the first hanger and the junction box housing.

2. The junction box housing system of claim 1, wherein the first hanger comprises a first portion and a second portion, wherein the first portion comprises a first end of the first hanger and the second portion comprises a second end of the first hanger, and wherein the first portion is movable relative to the second portion such that a distance from the first end to the second end is adjustable.

3. The junction box housing system of claim 1, wherein the first side of the sidewall comprises a first mounting aperture and a second mounting aperture, wherein the first mounting aperture and the second mounting aperture are aligned in the horizontal direction, and wherein the first hanger extends through the first mounting aperture and the second mounting aperture to connect the first hanger to the junction box housing.

4. The junction box housing system of claim 1,
wherein the first side of the sidewall defines a first mounting slot and the first hanger bracket engages the first mounting slot to connect the first hanger to the first side of the sidewall, and
wherein the second side of the sidewall defines a second mounting slot and the second hanger bracket engages the second mounting slot to connect the second hanger to the second side of the sidewall.

5. The junction box housing system of claim 4, wherein the second hanger bracket is movable along the second hanger between the first end and the second end of the second hanger.

6. The junction box housing system of claim 4, wherein:
the first hanger bracket comprises a first bracket stopper configured to engage the first hanger and retain the first hanger bracket in position along the first hanger; and
the second hanger bracket comprises a second bracket stopper configured to engage the second hanger and retain the second hanger bracket in position along the second hanger.

7. The junction box housing system of claim 4, wherein the first hanger bracket vertically translates within the first mounting slot to vary a vertical position of the first hanger relative to the junction box housing.

8. The junction box housing system of claim 1, further comprising:
a second housing stopper configured to engage the second hanger and the second side of the sidewall of the junction box housing to prevent relative translation between the second hanger and the junction box housing.

9. The junction box housing system of claim 1, wherein the junction box housing defines at least one wiring aperture.

10. The junction box housing system of claim 1, further comprising a luminaire positioned and retained within the housing chamber.

11. The junction box housing system of claim 4, wherein the first hanger bracket further comprises:
at least one locking tab extending away from the channel, wherein the at least one locking tab is configured to engage the first mounting slot; and
a bracket stopper configured to selectively engage the first hanger in the channel.

12. The junction box housing system of claim 11, wherein the first hanger bracket further comprises a stopper aperture extending through a body of the first hanger bracket transversely to the channel and a housing stopper in the stopper aperture, wherein the housing stopper is configured to position the housing and first hanger bracket relative to the first hanger.

13. The junction box housing system of claim 4, wherein the first mounting slot and the second mounting slot are on opposite sides of the sidewall, wherein the first mounting slot comprises a top end and a bottom end, wherein a lowermost vertical position of the junction box housing comprises the first hanger bracket engaged with the bottom end of the first mounting slot, and wherein an uppermost vertical position of the junction box housing comprises the first hanger bracket engaged with the top end of the first mounting slot.

14. A junction box housing system comprising:
a junction box housing comprising a sidewall and an endwall, the sidewall and the endwall defining a junction box housing chamber;
a first hanger connected to a first side of the sidewall;
a second hanger connected to a second side of the sidewall distal from the first side; and
a hanger bracket supporting the junction box housing on the first hanger, wherein the hanger bracket is positioned on the first hanger between a first end and a second end of the first hanger and is movable along the first hanger, wherein the hanger bracket comprises a bracket stopper configured to selectively engage the first hanger and retain the hanger bracket in position along the first hanger, and
wherein the junction box housing is movable along the first hanger and the second hanger in a horizontal direction.

* * * * *